(12) United States Patent
Egner-Walter et al.

(10) Patent No.: US 8,191,198 B2
(45) Date of Patent: Jun. 5, 2012

(54) WIPER BLADE

(75) Inventors: Bruno Egner-Walter, Heilbronn (DE); Michael Schäuble, Bietigheim-Bissingen (DE)

(73) Assignee: Valeo Wischersysteme GmbH, Bietigheim-Bissingen ( * ) Notice: Subject to any disclaimer, the term of this patent is extended or adjusted under 35 U.S.C. 154(b) by 1086 days.

(21) Appl. No.: 11/791,627

(22) PCT Filed: Nov. 22, 2005

(86) PCT No.: PCT/EP2005/012491
§ 371 (c)(1),
(2), (4) Date: Mar. 18, 2008

(87) PCT Pub. No.: WO2006/056406
PCT Pub. Date: Jun. 1, 2006

(65) Prior Publication Data
US 2008/0263806 A1 Oct. 30, 2008

(30) Foreign Application Priority Data
Nov. 25, 2004 (DE) .......................... 10 2004 056 835

(51) Int. Cl.
*B60S 1/40* (2006.01)
*B60S 1/46* (2006.01)
*B60S 1/52* (2006.01)
(52) U.S. Cl. ................ 15/250.04; 15/250.32; 239/284.1
(58) Field of Classification Search ............... 15/250.02, 15/250.04, 250.32, 250.361; 239/284.1, 239/284.2
See application file for complete search history.

(56) References Cited

U.S. PATENT DOCUMENTS

| 2,432,690 | A |   | 12/1947 | Smulski |
| 3,304,569 | A | * | 2/1967 | Christensen ............... 15/250.04 |
| 4,060,872 | A |   | 12/1977 | Bucklitzsch et al. |
| 4,339,839 | A |   | 7/1982 | Knights et al. |
| 5,433,382 | A | * | 7/1995 | Baumgarten et al. ...... 239/284.1 |
| 6,032,324 | A |   | 3/2000 | Lansinger |
| 2003/0019066 | A1 | * | 1/2003 | Egner-Walter ............ 15/250.04 |

FOREIGN PATENT DOCUMENTS

| BE | 544 311 A | 1/1956 |
| DE | 2 133 270 | 7/1971 |
| DE | 40 20 644 C2 | 8/1991 |
| DE | 100 00 372 A1 | 8/2001 |

(Continued)

OTHER PUBLICATIONS

Search Report issued Jun. 2, 2005, by the German Patent and Trademark Office in related Application No. DE 10 2004 056 835.9 (3 pages).

(Continued)

*Primary Examiner* — Gary Graham
(74) *Attorney, Agent, or Firm* — Osha • Liang LLP (57) ABSTRACT

In the case of a wiper blade for cleaning windscreens on vehicles, particularly motor vehicles, with at least one spray duct arranged in the wiper blade with spray orifices for applying a washing or cleaning fluid to the windscreen to be cleaned, with at least one first connection for connection of the spray duct to an external line for supply of the washing or cleaning fluid and with at least one adapter for connecting the wiper blade to a wiper arm, the at least one connection is part of a connection and distribution element provided on the adapter, which is connected by at least a second connection to a duct section of the spray duct extending away from the adapter.

13 Claims, 8 Drawing Sheets

FOREIGN PATENT DOCUMENTS

| | | |
|---|---|---|
| DE | 100 36 122 A1 | 4/2002 |
| EP | 1 209 050 A2 | 5/2002 |
| FR | 2 648 771 | 6/1989 |
| GB | 2 362 812 A | 12/2001 |

OTHER PUBLICATIONS

International Search Report for PCT/EP2005/012491 mailed Mar. 29, 2006 (6 pages including English translation).

* cited by examiner

WIPER BLADE

The invention concerns a wiper blade, specifically a flat wiper blade for a wiping device for cleaning windscreens of vehicles, particularly road vehicles.

In order to improve cleaning of vehicle windscreens, it is known, (DE 100 00 372), to provide in wiper blades at least one spray duct, extending in The direction of the wiper blade axis, which is equipped with a multitude of spray orifices sequentially arranged in the longitudinal direction of the wiper blade. By means of these, on operating the windscreen washer unit, a washing or cleaning fluid (in the simplest case water, or however water with cleaning and/or antifreeze additives) can be applied to the vehicle windscreen and to be more precise, in the immediate vicinity of the wiping lip formed by the wiping rubber or wiping strip.

In order to supply the washing and cleaning fluid, the spray duct is connected at one end of the flat wiper blade with and external hose line. The disadvantage in this case is that the hose line starting from the wiper arm of the washing device extends over a relatively long exposed length, which is not only determined by the distance between the wiper blade end involved and the wiper arm with a wiper blade lying on the vehicle windscreen, but also by the curvature which the wiper blade has with the wiper arm folded away from the vehicle windscreen. This exposed length of hose is visually disturbing and may also be very readily damaged however in car washing plants for example.

Furthermore suggested (DE 21 33 270) was to connect an external supply or hose line in order to feed the cleaning or washing fluid to a spray duct formed in a wiping rubber on this duct between both ends of the wiping rubber and the wiper blade. This suggestion does not contain a viable solution though.

Also finally known (FR 2 648 771) is to design the mounting rail or spring rail for the wiping rubber of a wiper blade, which is connected to the wiper arm via a carrier stirrup arrangement formed of several bow-like carrier elements, with a spray duct which has a multitude of spray orifices and which extends over the entire length of the spring rail. The cleaning and washing fluid is supplied by an additional connection piece in the centre of the spring rail. This known design is elaborate in terms of structure. A flat wiper blade is also not involved in this case.

The object of the invention is to show a wiper blade which can be designed as a flat wiper blade and avoids the disadvantages of a visually disturbing and easy to damage exposed hose line for supply of the cleaning and washing fluid. In order to fulfil this task, a wiper blade is designed.

The particular advantage of the embodiment according to the invention lies in the fact that the connection and distribution element for supply and distribution of the washing and cleaning fluid to the at least two sections of the spray duct extending away in the opposite direction from the adapter is provided on the adapter serving to connect the wiper blade to the wiper arm.

In one embodiment of the invention, this connection and distribution element basically functioning or designed as a T piece is integrated in the adapter, i.e. the distribution duct with the first connection for connection to the external hose line and with the second connections for connection to the duct sections on the wiper blade side is formed there. In a further embodiment of the invention, the connection and distribution element is a separate component, which can be fixed to the adapter.

Further developments of the invention are the subject of the subclaims. The invention will be described below with reference to various embodiments on the basis of the figures. In said figures:

In FIGS. 1-4, 1 is respectively one wiper arm of one washing device for the front windscreen of a road vehicle for example, e.g. a private car. The wiper arm 1 can be pivoted at one end by a drive which is not illustrated around the axis of a wiper shaft 2, that is to say between the parked position represented in FIG. 1 and a return position not illustrated.

On the end distant from the wiper shaft 2, a wiper blade 4 is attached to the wiper arm 1 by means of an adapter 3. The wiper blade 4 is only very schematically represented in each case in FIGS. 1-4 and in its design as a flat wiper blade for example has at least one spring rail, one wiping rubber with a wiping lip lying against the vehicle screen in addition to a profile element designed as a spoiler for example, which like the spring rail and the wiping rubber extends over the entire length of the wiper blade 4.

Figure 1:
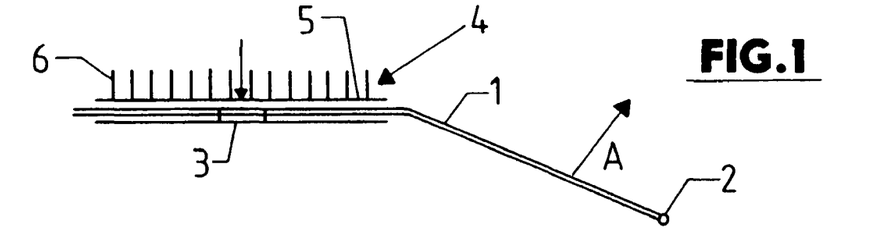
FIG. 1-4 shows a very schematic representation respectively of a wiper arm and a wiper blade fixed to the latter with several spray jets or orifices, with various different embodiments and with a wiper arm in parked position respectively.

In the embodiment in FIG. 1, a spray duct for a washing or cleaning fluid extending in the longitudinal direction of the wiper blade and schematically implied by 5 is formed. The spray duct 5 possesses a multitude of spray orifices from which on operating the windscreen washer unit, the washing or cleaning fluid (for example water, or water with cleaning and/or antifreeze additives) is applied to the vehicle windscreen, as is schematically implied with the jets 6 in FIG. 1. The spray duct 5 is connected with a line which is not illustrated fixed to the wiper arm 1 or integrated in the wiper arm 1 (e.g. hose line), through which the washing or cleaning fluid is conveyed with the necessary pressure. As FIG. 1 shows, the spray orifices generating the jets 6 are located on the longitudinal side of the wiper blade 4 which hurries ahead when moving the wiper arm 1 from the parked position (arrow A).

Figure 2:
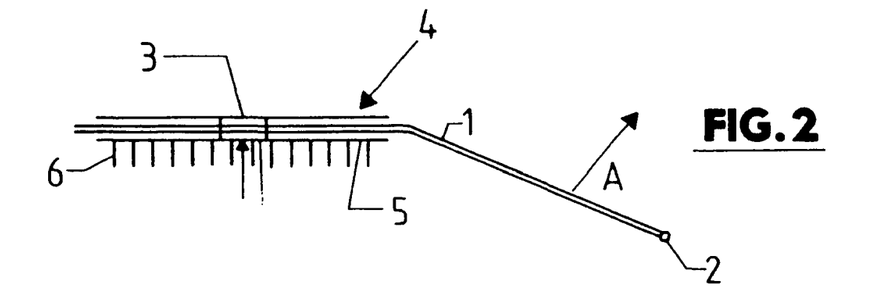

FIG. 2 shows an embodiment which differs from the embodiment in FIG. 1 only in that the spray orifices generating the jets 6 are provided on the longitudinal side of the wiper blade which lags behind when moving the wiper arm 1 from the parked position (arrow A).

Figure 3:
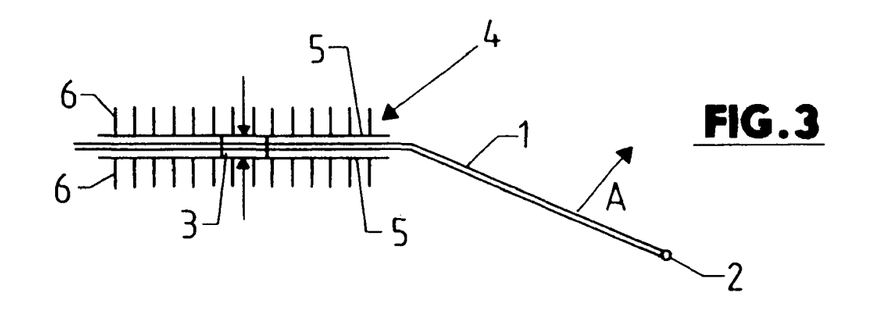

FIG. 3 shows an embodiment which differs from the embodiment in FIGS. 1 and 2 in that the wiper blade 4 has spray orifices which are effective on both wiper blade longitudinal sides, i.e. on operating the windscreen washer unit, washing and cleaning fluid is applied to the vehicle windscreen both in front of and behind the wiper blade.

The spray ducts 5 are supplied for example by an external supply line with corresponding ramification, for example in the area of the adapter 3 or by two separate supply lines however.

Figure 4:
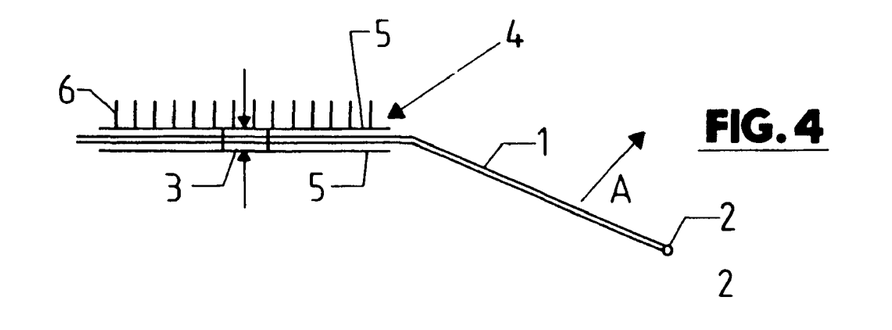

FIG. 4 shows an embodiment similar to FIG. 3 in which the wiper blade 4 is again equipped with spray orifices effective on both longitudinal sides, in which however, by means of an appropriate control, depending on the direction of movement of the wiper arm 1, only the spray orifices effective on one wiper blade longitudinal side and the corresponding spray duct 5 are respectively supplied with washing and cleaning medium, for example only the spray duct of the spray orifices on the wiper blade longitudinal side which hurries ahead during the movement.

Common to all the embodiments presented in FIGS. 1-4 is the fact that the washing and cleaning fluid in the area of the adapter 3 respectively is supplied at a position between both ends of the wiper blade 4, so that taking account of the necessary relative movement between the wiper blade 4 and the wiper arm 1, the external connection for supplying the washing and cleaning fluid can be performed via a relatively short, non-interfering length of hose which is also not susceptible to malfunction.

FIGS. 5-11 show a wiper blade 4a, which as a flat wiper blade basically consists of an internal spring rail 7, a wiping rubber 8 with a wiping lip 9 held on the spring rail 7 and a two-part profile body 10 fixed to the spring rail, which together with a profile section 10.1 on the upper side of the wiper blade 4a forms a spoiler and is designed in two lower profile sections 10.2 on both sides of the wiping rubber 8 each with a duct section 11 of a spray duct for the washing and cleaning fluid. The spring rail 7, the wiping rubber 8 in addition to the profile body 10 extend each over the entire length of the wiper blade 4. At both ends of the wiper blade, the ducts 11 are close in a suitable manner, for example by inserted plugs or by shaped spigots or plugs of end pieces provided there.

Figure 8:
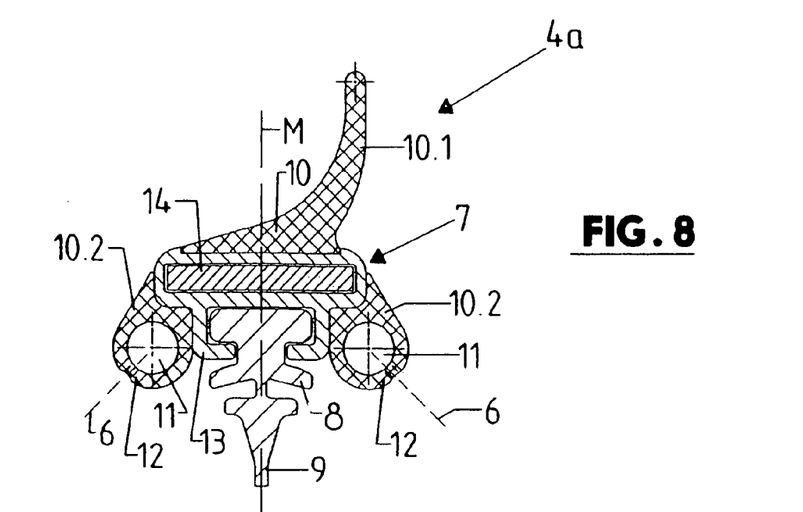
FIG. 8 shows a section through the wiper blade of FIGS. 5 and 7.

As FIG. 8 also shows, the profile sections 10.2 are equipped with a multitude of spray orifices 12 sequentially arranged in the longitudinal direction of the wiper blade 4a, which are respectively open on the outer side of the profile body 10 and lead to a duct section 11. The axes of the spray orifices 12 are oriented in such a manner that they form an angle smaller than 90° with the central plane M of the spring rail and the wiping rubber 8, which opens to the lower side of the wiper blade 4a, i.e. to the vehicle windscreen so that the spray jets emerging from the spray orifices 12 each impinge on the vehicle windscreen at a certain distance from the wiping lip 9.

The profile body 10 is formed from a length of plastic extruded section, made of an elastomer plastic for example. The spring rail 7 is designed in two parts in the embodiment presented and consists of a profile rail 13 made of plastic in addition to a rail-like or strip like spring element 14 made of spring steel, which is arranged with its surface in planes vertical to the central plane M. The profile rail 13 forms a closed chamber to receive the spring element 14 and with the presentations chosen for FIG. 8, a C-shaped profile section underneath in which the wiping rubber 8 is held.

The adapter 3a attached in the centre of the wiper blade or on the wiper arm approximately in the centre of the wiper blade serves in order to fix the wiper blade 4a to a wiper arm 1 and is designed in two parts in the embodiment presented, consisting to be more precise of two identical halves or adapter parts 15. Both are manufactured from metal or for example from plastic by die-casting in such a manner that with the adapter 3a fixed to the wiper blade 4a, the former overlaps the spring rail 7 with profile sections 15.1 in the manner of a slide and with a positive fit and naturally in such a way that the wiping rubber 8 projects downwards over this adapter in the area of the adapter.

In order to safeguard the adapter 3a on the spring rail 7 against displacement in the longitudinal direction, projections 16 are shaped internally on the profile sections 15.1, which engage in lateral recesses of the profile rail 13. On wall-like profile sections 15.2 above the spring rail 7, the two adapter halves or parts 15 lie flush against each other in a separation or connection plane TE and are connected to one another, to be more precise by the fact that each adapter part 15 has a shaped pin 17, received when the adapter parts 15 are connected by an appropriate recess 18 of the other adapter part. The plane TE is simultaneously the central plane M, to which the spring rail 7 in addition to the wiping rubber 8 are arranged in mirror image.

Figure 5:
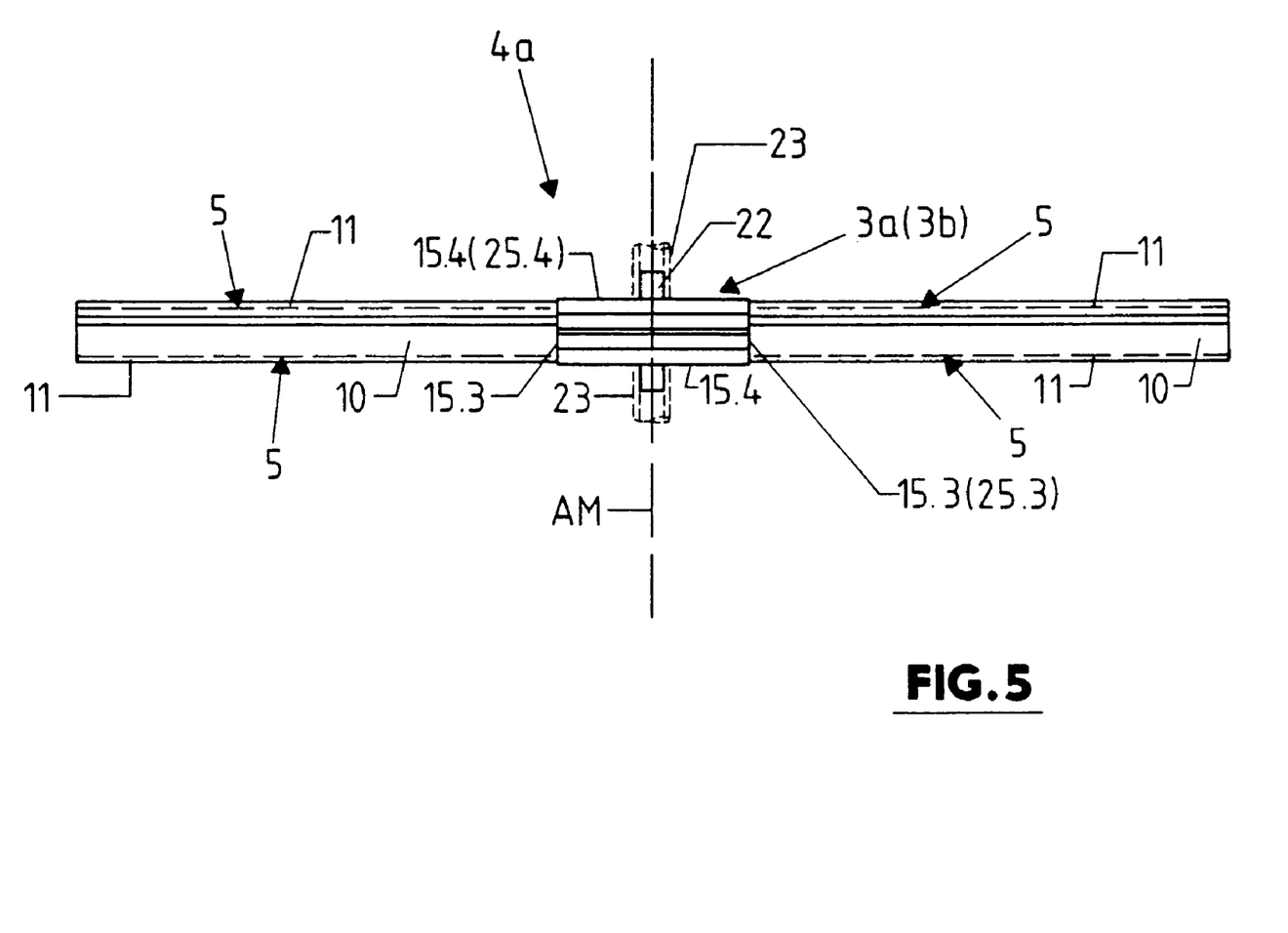
FIG. 5 shows a simplified representation of a top view of a wiper blade according to the invention.
Figure 6:
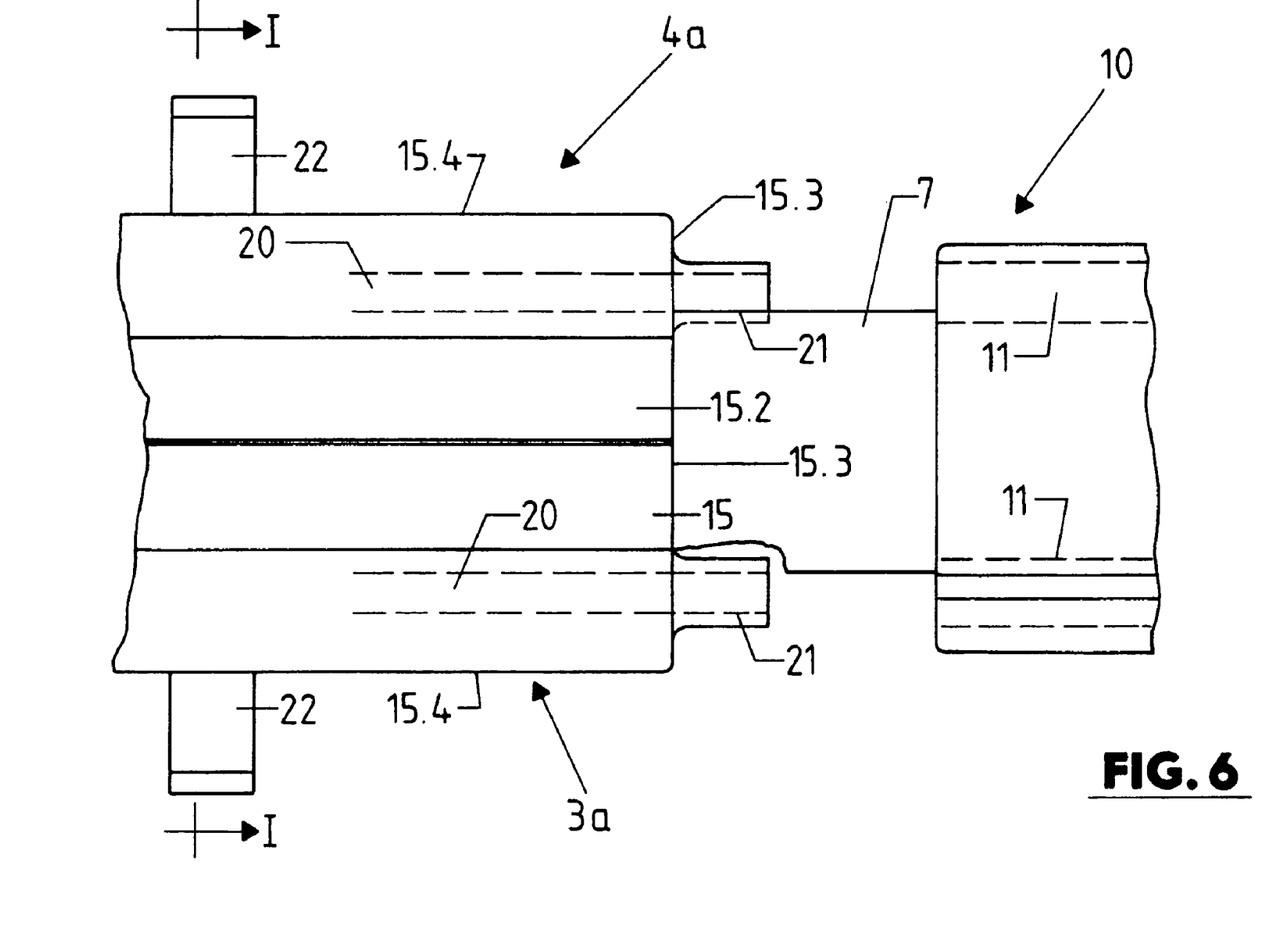
FIG. 6 shows a simplified partial representation of the FIG. 5 in the area of the adapter for attaching the wiper blade to the wiper arm.
Figure 7:
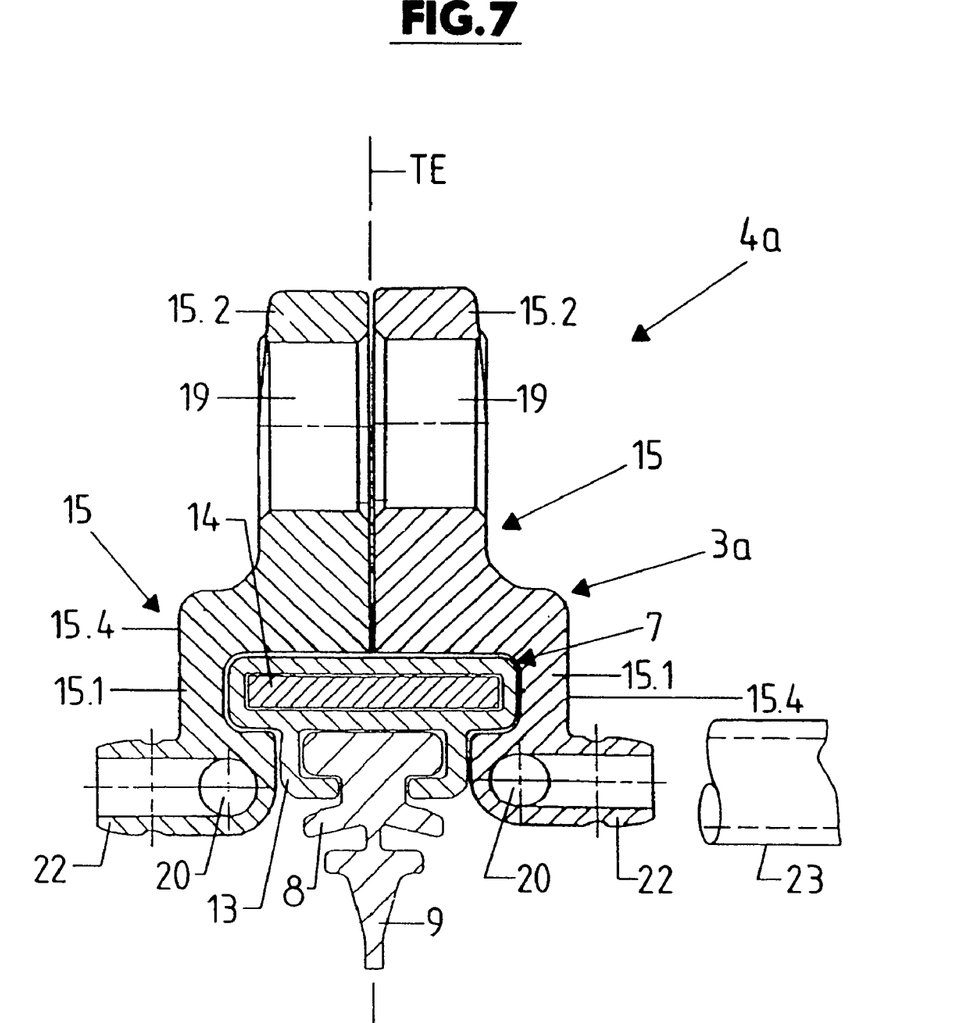
FIG. 7 shows a simplified representation of a section along line I-I of FIG. 6.
Figure 9:
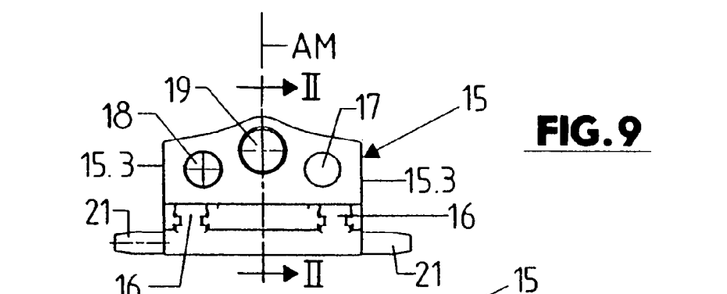
FIG. 9-10 shows half or part of the two-part adapter in FIGS. 6 and 7 in various different views.
Figures 10, 11:
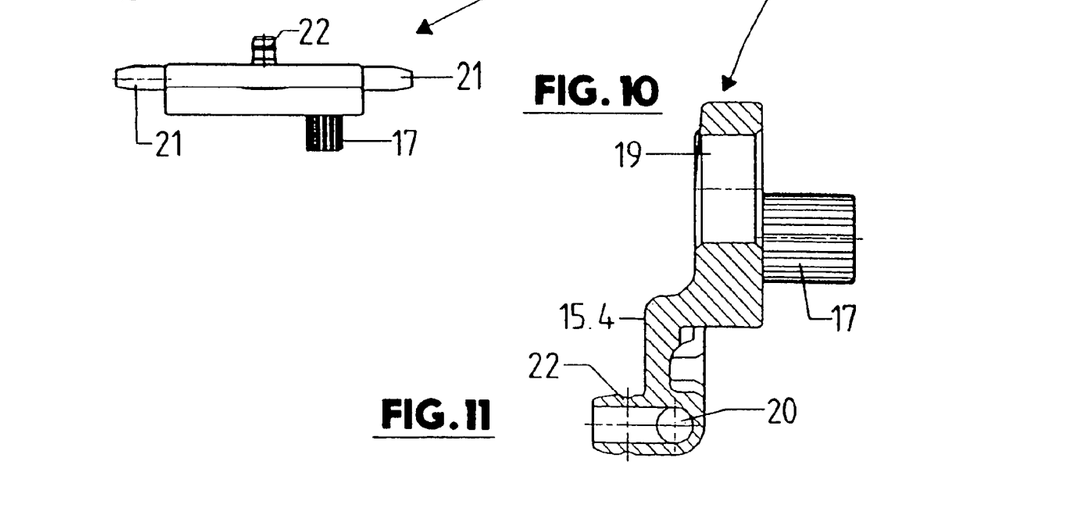
FIG. 11 shows a section along line II-II of FIG. 9.

With AM a central plane of the respective adapter part 15 is indicated in FIGS. 5 and 9 which (central plane) lies vertically to the plane TE (FIG. 7) and to which each adapter part 15 except for the pin 17 and the appropriate drill hole 18 is arranged in mirror image, with the pin 17 and the drill hole 18 located with the same axis distance respectively on different sides of the plane AM. In the area of the central level AM, the profile section 15.2 of each adapter part 15 is equipped with a drill hole 19, oriented with its axis vertically to the plane TE and serving to fix the adapter 3 to the wiper arm 1.

Indicated as 15.2 in the figures are the two faces oriented away from one another and respectively arranged in planes vertically to the longitudinal extension of the wiper blade 4a and as 15.3 the outer sides of the adapter parts 15 and the adapter 3a facing away from the spring rail.

Each adapter part 15 is designed as a connection and distribution element on the profile section 15.1 and on the bottom free edge extending vertically to the plane AM, to be more precise with a connection and distribution duct 20 extending in the axis direction vertically to the plane AM, which merges at both ends into a hollow pin-like connection 21, and with a hollow pin-like connection 22, which leads approximately in the centre to the connection and distribution duct 20. The two connections 21 are respectively located on one of the two faces 15.3 and the connection 22 on the outer side 15.4 of the adapter part 15 involved. The respective connection and distribution duct 20 with the connection pieces 21 and 22 therefore forms a T piece incorporated in the adapter part 15 involved.

After fixing the adapter 3a to the spring rail 7, a part of the profile body 10 is respectively pushed on to this spring rail on both sides of the adapter 3a in such a manner that the connections 21 provided on the face 15.3 involved respectively reach into a duct section 11 and a liquid-tight hydraulic connection between the connection and distribution duct 20 and the adjacent duct section 11 is achieved which is subsequently provided in the same axis as the axis of the connection and distribution duct 20 and the connection 21. The connection 22 is respectively connected with an external hose line 23 for supply of the washing and cleaning fluid. The connection and distribution duct 20 lies in the same axis as the connections 21 and also in the same axis as the duct sections 11.

The spray orifices 12 can be realised in the most diverse manners, with the aid of a drilling tool for example, by piercing or with the aid of a laser device, with the arrangement and/or size of the spray orifices 12 being optimally adapted to the respective application.

In a preferred embodiment, the spray orifices 12 are realised in such a way that they only open with sufficient pressure (pressure threshold value) of the washing or cleaning fluid and close automatically when the pressure falls below the pressure threshold value, so that evaporation of an antifreeze and/or cleaning additive, for example alcohol, in the duct section 11 and in the area of the spray orifices 12 is avoided and therefore also freezing of the spray orifices 12.

Figure 12:
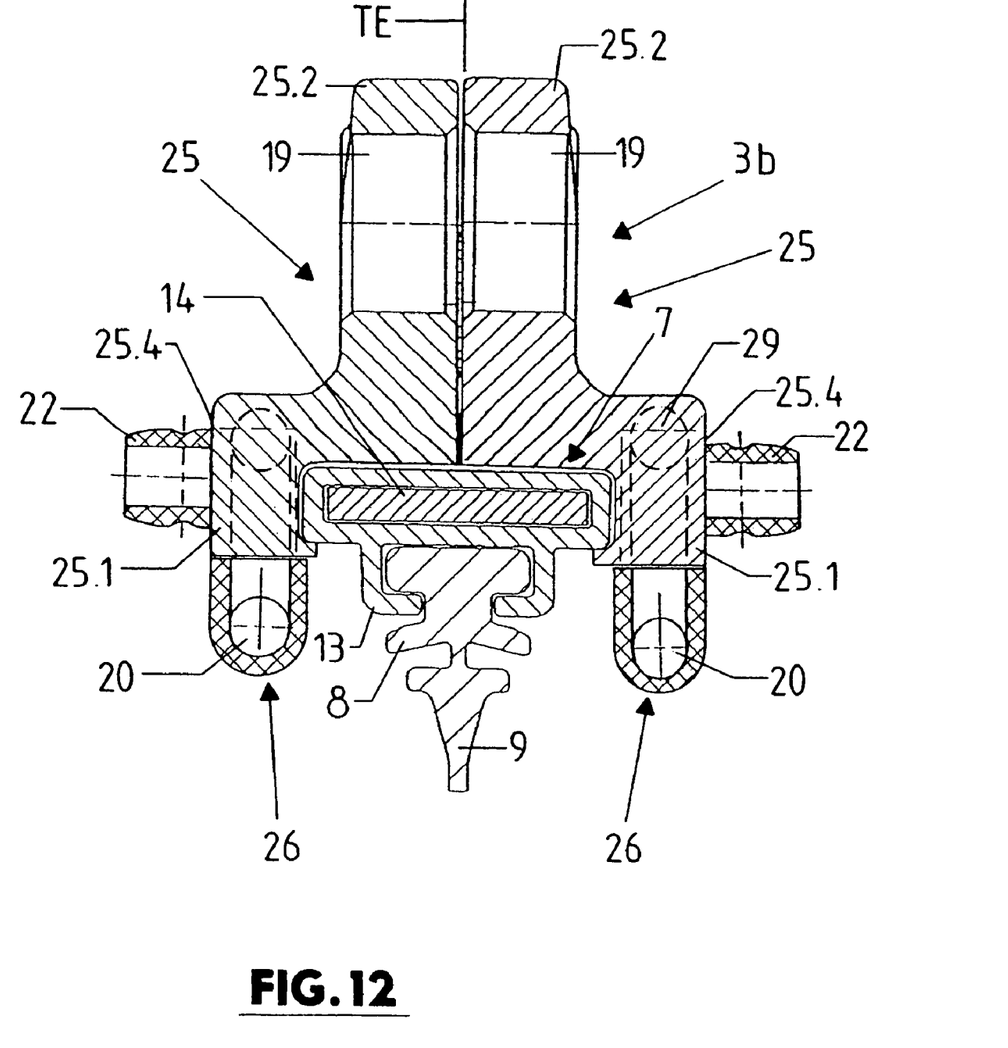
FIG. 12 shows a representation similar to FIG. 7 with a further possible embodiment of the invention.

FIGS. 12-19 show a wiper blade 4b, which only basically differs from the wiper blade 4a in that instead of the two-part adapter 3a, a two-part adapter 3b is used, which consists of the two adapter halves or parts 25, which with regard to their shape are almost identical to the adapter parts 15, but with the difference that the connection and distribution duct 20 is not incorporated in the adapter parts 25. As FIG. 12 shows, the spring rail 7 in this wiper blade is again surrounded with a positive fit and in the manner of a slid by the adapter 3b and its profile sections 25.1. Furthermore, the two adapter parts 25 with their profile sections 25.2, which lie adjacent to each other in the separation or connection plane TE, are connected there and again among other aspects by the pin 17 engaging in the drilling holes 18. With the exception of the pin 17 and the corresponding drill hole 18, the adapter parts 25 are again designed in mirror image with regard to the plane AM. The axis distances of the pin 17 and the corresponding drill hole 18 from the plane AM are identical. The drill hole 19 is located in the central plane.

25.3 indicates the two faces of the adapter 3b arranged in planes vertically to the longitudinal extension of the wiper blade 4b and 25.4 indicates the two outer sides of this adapter.

On the bottom side of the profile section 25.1 located away from the profile section 25.2, a connection and distribution element 25 manufactured as an injection moulded plastic component is also attached in this embodiment, by snapping in place. The connection and distribution element 26 consists of a tube-like body 27, in which the connection and distribution duct 20 is arranged and which has a connection 21 on both ends respectively. The connection 22 for the external hose line 23 is provided in the centre on the body 27. The connection 22 does not lead directly into the connection and distribution duct 20 in this embodiment, but into a tube-shaped attachment 28, which projects radially over the upper side of the body 27 in FIGS. 18 and 19 and which is connected for its part with the distribution duct 20 within the body 27. On the top end distant from the body 27 in these figures, the duct of the attachment 28 is closed in a suitable manner, for example by an inserted ball 29.

In order to fix the connection and distribution element 26 to the underside of the respective profile section 25.1, on the upper side of the body 27, on which (upper side) the attachment 28 is also provided, two radially projecting pins 30 are formed, the corresponding drill holes 31 of which are arranged on the underside of the respective profile section 25.1, so that the pins 30 can be inserted into a drill hole 31 respectively fixing the connection and distribution element 26. For final locking, catches 32 are formed on the body 27, which engage on counter catches 33 arranged on the outer surface 25.4 of the adapter part 25 involved after insertion of the pins 30 in the drill holes 32.

Figures 13, 16:
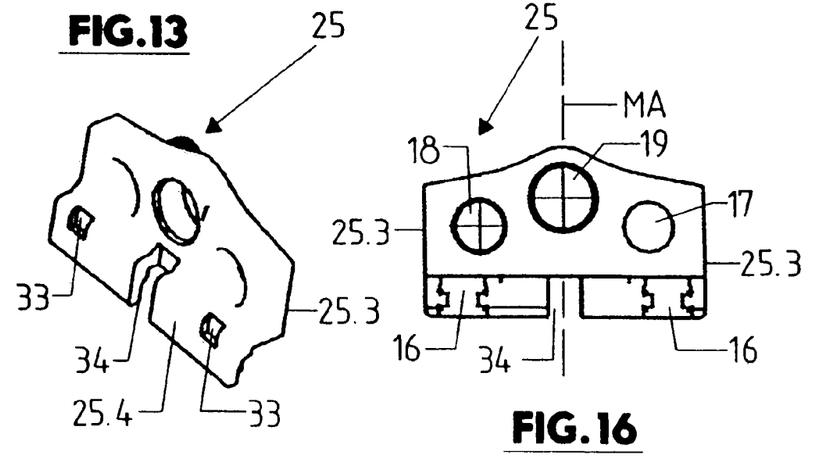
FIG. 13-16 shows a perspective view of half or part of the two-part adapter in FIG. 12, in various different views.
Figure 14:
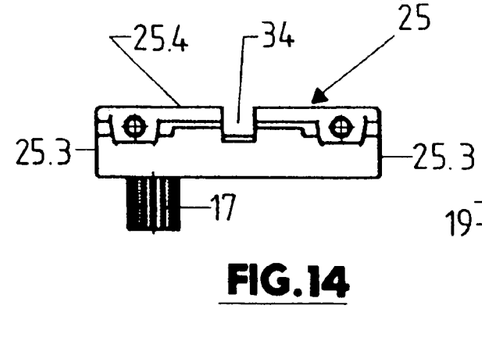
Figure 15:
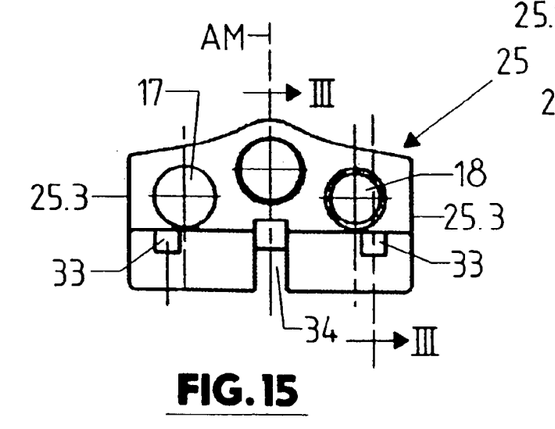
Figure 17:
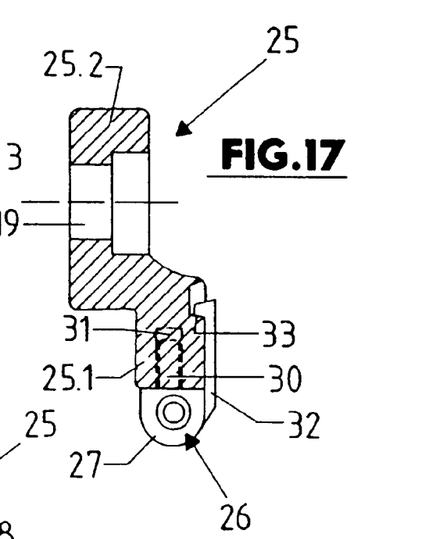
FIG. 17 a section along III-III of FIG. 15, together with a connection and distribution element.
Figure 18:
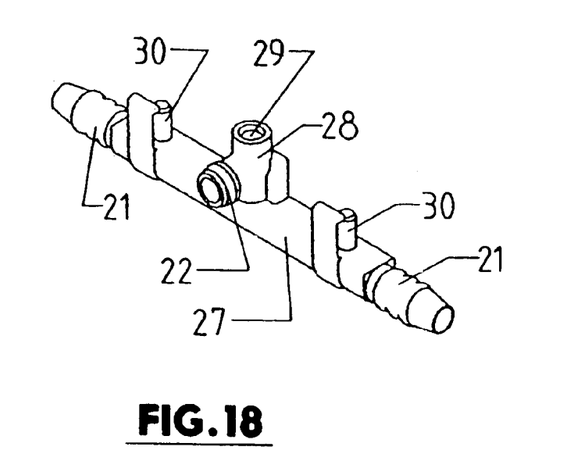
FIG. 18 a perspective representation of a connection and distribution element for use with the wiper blade and adapter in FIGS. 12-17
Figure 19:
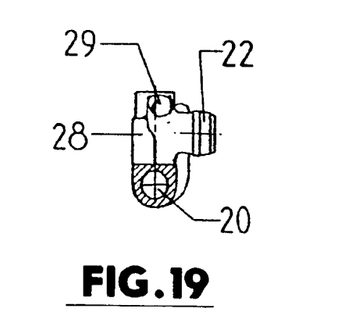
FIG. 19 a section through the connection and distribution element in 18.

As FIGS. 13 and 17 particularly show, the adapter parts 25 have a recess 34 on the profile section 25.1, which receives the attachment 28 with the connection and distribution element attached to the adapter part 25 involved, as a result of which an additional hold for the connection and distribution element on the adapter part 25 is achieved and a particularly slender construction for the adapter 3b with the connection and distribution element 26 results. The connection 22 oriented with its axis vertically to the plane M is in a definite distance from the underside of the adapter 3b and therefore also the connected hose in at sufficient distance from the vehicle windscreen.

The connections 21 are once again, as described above for the wiper blade 4a, connected to a duct section 11 respectively on push-fitting the components of the profile body 10 on to the spring rail 7. The respective connection 22 is connected to the external hose line 23. Especially in this embodiment, it is also possible to provide a connection and distribution element 26 on only one of the adapter elements 25, so that only one of the two duct sections 11 of the profile body 10 is supplied with the washing and cleaning fluid and/or the parts of the profile body 10 provided on both sides of the adapter 3b are only designed with one duct section 11 respectively.

Figure 20:
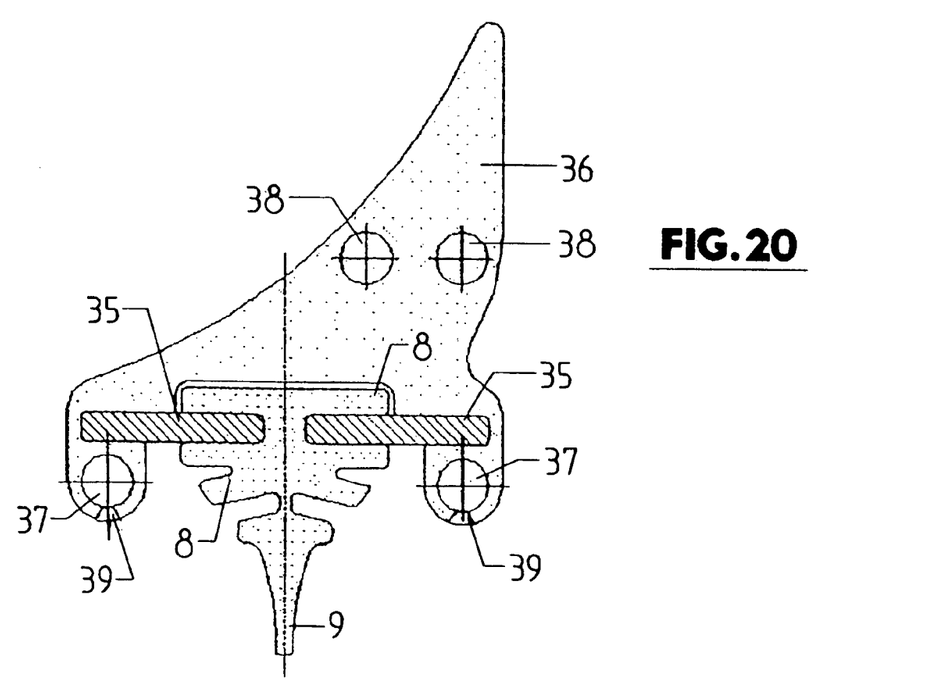
FIG. 20 a section through a wiper blade according to a further possible embodiment.

FIG. 20 shows in a presentation similar to that in FIG. 8 a wiper blade 4c, which is formed of a wiping rubber 8 with a wiping lip 9 and of two parts of a profile body 36 shaped as spoilers on the wiper blade upper side, which are provided on both sides with a corresponding adapter, for example with regard to the function of adapter 3a. The wiping rubber 8 is held on the profile body 36 over the two spring rails 35. A total of four spray ducts are arranged in the profile body 36 in this embodiment, to be precise with the duct sections 37 two spray ducts on both sides of the wiping rubber 8 and underneath the spring rails 35 and with the duct sections 38 two further spray ducts above the spring rails 35. All the duct sections 37 and 38 are in turn provided with spray orifices 39 for spraying the washing or cleaning fluid.

The adapter corresponding to the adapter 3a for example is immediately fixed to both spring rails 35 in this embodiment. The ducts corresponding to the connection and distribution ducts 20 designed in this adapter are connected with a spray duct section 37 and 38 respectively.

The invention has been described above on the basis of embodiment examples. It is understood that many variations and modifications are possible. It is therefore possible for example, with wiper blade 4a, to manufacture the profile body 10 and the profile rail 13 from one and the same material, plastic material for example and/or inject the profile body 10 in a two-component injection moulding procedure on to the profile rail 13.

Furthermore, it is also possible to design the adapter 3a in such a way that only one of the two adapter parts 15 has the connection and distribution element incorporated in this part, i.e. the connection and distribution duct 20 and both connections 21 and 22 and to be more precise, when designing the wiper blade with only one spray duct.

Furthermore, it is also possible to design the adapter in such a way that several spray ducts, for example spray ducts on both longitudinal sides of the wiper blade are supplied with the cleaning and washing fluid by a single connection 22 or by a single hose line 23.

In all the embodiments described above, the spray ducts and the duct sections forming these ducts are provided in the profile body 10 and 35 of the wiper blade respectively. It is in principle also possible to provide such ducts in the wiping rubber 8 with an appropriate design.

Furthermore, it is also possible to design the respective adapter as a single component and subsequently incorporate the at least one connection and distribution element and the duct 20 involved and the connections 21 and 22 in this adapter or depending on the connection and distribution element 26 to attach the latter as a separate component to the otherwise single-piece adapter, by engagement for example or another suitable means.

REFERENCES

1 Wiper arm
2 Wiper axis
3, 3a, 3b Adapter
4, 4a, 4b, 4c A wiper blade
5 Spray duct
6 Jet of cleaning or washing fluid
7 Spring rail
8 Wiping rubber
9 Wiping lip
Profile body
10.1, 10.2 Profile section of the profile body 10
11 Spray duct section
12 Spray orifice
13 Profile rail
14 Spring element
15 Adapter part
15.1, 15.2 Profile section
15.3 Face of adapter part 15 and adapter 3a
15.4 Outer side of adapter part 15 and adapter 3a
16 Projection
17 Pin
18 Opening
19 Drill hole
20 Connection and distribution duct
21, 22 Connection
23 Hose line
25 Adapter part
25.1, 25.2 Profile section
25.3 Face of adapter part 25 and adapter 3b
25.4 Outer side of adapter part 25 and adapter 3b
36 Connection and distribution element
27 Body of the connection and distribution element
28 Section or extension
29 Closure element
30 Pin
31 Drill hole
32 Catch
33 Counter catch
34 Recess
35 Spring rail
36 Profile body
37, 38 Spray duct section
39 Spray orifice

The invention claimed is:

1. A flat wiper blade for cleaning windscreens of vehicles, comprising:
   at least one spray duct with spray orifices arranged in the wiper blade for application of a washing or cleaning fluid to the windscreen to be cleaned;
   at least one first connection for connecting the at least one spray duct to an external line for supplying the washing or cleaning fluid; and
   at least one adapter for connecting the wiper blade to a wiper arm of a wiping device, wherein:
   the at least one connection is part of a connection and distribution element provided on the at least one adapter, which is connected by at least one second connection respectively to a duct section of the at least one spray duct extending away from the adapter,
   a connection or distribution duct, extending in a longitudinal direction of the wiper blade and forming one of the at least one second connection at both ends, respectively, and leading into the at least one first connection,
   the at least one adapter overlaps the wiper blade or at least a spring rail of the wiper blade in a clamp or slide manner with profile sections, and
   the connection and distribution duct or the connection or distribution element which comprises the connection or distribution duct is arranged on an underside facing a wiping lip of at least one of the profile sections.

2. The wiper blade according to claim 1, wherein the at least one spray duct is arranged on at least one longitudinal side of the wiper blade, which is formed by at least two duct sections extending away in the opposite direction from the at least one adapter.

3. The wiper blade according to claim 1, wherein the at least one spray duct is provided on both longitudinal sides of the wiper blade, which is formed by at least two duct sections extending away in the opposite direction from the at least one adapter.

4. The wiper blade according to claim 1, wherein the duct section forming the at least one spray duct is provided in a wiper blade body or profile body, on which a wiping rubber having at least one wiping lip is held.

5. The wiper blade according to claim 1, wherein the at least one connection and distribution element comprising the connection and distribution duct, with the first and second connections is manufactured in one piece with the at least one adapter or with adapter elements forming the at least one adapter.

6. The wiper blade according to claim 1, wherein the at least one connection and distribution element is preferably fixed by snapping in place on the adapter or on an adapter part forming this adapter.

7. The wiper blade according to claim 6, wherein the connection and distribution element consists of a tube-shaped body having the connection and distribution duct with the first and second connections.

8. The wiper blade according to claim 7, wherein pins or latches or catches are arranged on the tube-shaped body and that drill holes to receive the connecting pins in addition to counter catches for the latches or catches are provided on the adapter.

9. The wiper blade according to claim 7, wherein pins or latches or catches are arranged on the tube-shaped body and that drill holes to receive the connecting pins in addition to counter catches for the latches or catches are provided on the at least one adapter.

10. The wiper blade according to claim 1, wherein the at least one adapter is manufactured in two parts with at least two adapter parts.

11. The wiper blade according to claim 1, wherein the at least one adapter is manufactured in one piece.

12. The wiper blade according to claim 1, wherein the spray orifices are self-closing orifices which only open at a threshold value of the pressure of the cleaning or washing fluid present in the respective spray duct.

13. The wiper blade according to claim 12, wherein at least one spray duct is provided in a part of the wiper blade manufactured from, an elastomer plastic, and wherein the spray orifices are formed of at least one slit respectively, opening edges of which lie adjacent to one another forming a seal when the pressure of the cleaning and washing fluid is below the threshold value, wherein the seal is only released by the respective spray orifice at a pressure above the threshold value.

* * * * *